United States Patent [19]

Kothe et al.

[11] Patent Number: 5,006,701

[45] Date of Patent: Apr. 9, 1991

[54] SENSOR SYSTEM WITH SOURCE REGULATION COUPLED TO SENSOR CIRCUIT SENSITIVITY

[76] Inventors: Karl-Peter Kothe, Beerbacher Str. 15, 6100 Darmstadt-Eberstadt; Manfred W. Gekeler, Pulverhäuserweb 62, 6100 Darmstadt; Karl-Heinz Meier, Im Flürchen 1, 6107 Zeilhard, all of Fed. Rep. of Germany

[21] Appl. No.: 362,394

[22] PCT Filed: Sep. 30, 1988

[86] PCT No.: PCT/DE88/00603

§ 371 Date: Jul. 11, 1989

§ 102(e) Date: Jul. 11, 1989

[87] PCT Pub. No.: WO89/03080

PCT Pub. Date: Apr. 6, 1989

[30] Foreign Application Priority Data

Oct. 1, 1987 [DE] Fed. Rep. of Germany ....... 3733256

[51] Int. Cl.[5] .............................................. G01J 1/32

[52] U.S. Cl. ..................................... 250/205; 315/151

[58] Field of Search ................. 250/205; 315/151, 158

[56] References Cited

U.S. PATENT DOCUMENTS

| | | | |
|---|---|---|---|
| 3,917,974 | 11/1975 | Lucchesi et al. | 250/205 |
| 3,919,546 | 11/1975 | Lutus | 250/205 |
| 4,272,188 | 6/1981 | Lehman et al. | 315/151 |
| 4,649,267 | 3/1987 | Ray | 250/205 |

*Primary Examiner*—David C. Nelms
*Assistant Examiner*—Que Tan Le
*Attorney, Agent, or Firm*—Antonelli, Terry, Stout & Kraus

[57] ABSTRACT

Sensor system for regulating machines, especially sewing machines, with a light barrier comprising a light emitter and a light receiver. The light emitter provided is an incandescent lamp supplied from an energy source. An evaluating stage of adjustable sensitivity is connected to the light receiver. The energy source of the incandescent lamp is regulated, and is coupled with the evaluating stage in such a way that the desired value of the regulated energy source is automatically adjustable in dependence on the sensitivity setting of the evaluating stage.

16 Claims, 3 Drawing Sheets

SENSOR SYSTEM WITH SOURCE REGULATION COUPLED TO SENSOR CIRCUIT SENSITIVITY

The invention relates to a sensor system for controlling machines, especially sewing machines, with a light barrier comprising a light emitter and a light receiver, the light emitter provided being an incandescent lamp supplied from an energy source, and an evaluating stage of adjustable sensitivity being connected to the light receiver.

Sensor systems of the type presently under consideration are employed, for example, in conjunction with sewing machines in order to recognize the end of seamed material during conductance of sewing operations and to automatically stop the sewing procedure or to execute a predetermined number of residual stitches following the end identification. Additional areas of application of such sensor systems are, inter alia, welding and cutting machines. The sensor system recognizes the beginning and end of the material to be worked on, based on changes of the conditions ambient in the beam path of the light barrier. This involves, for example, in case of a transmitted light barrier the more or less intense reduction in light transmitted from the emitter to the receiver based on the presence or absence of material in the beam path of the light barrier, or changes in the light transmission of the material. In case of reflected light barriers, the sensor means can respond to variations in the reflection properties during passage of the material to be worked upon. Independently of the details of the structure of the arrangement, the sensitivity of the evaluating stage connected to the light receiver is adjusted in dependence on the respective properties of the material involved in such a way that certain edge identification becomes possible; for example when sewing labels onto sewing material, an unequivocal determination can be made whether only the sewing material or the sewing material plus label lies in the beam path.

Under practical conditions, the lifetime of the incandescent lamps provided as the light transmitter is frequently unsatisfactorily brief because the incandescent lamp is under high stress not only in thermal respects but also mechanically, e.g. due to machine vibrations. The replacement of incandescent lamps by light-emitting diodes is impossible because light-emitting diodes do not afford the needed high sensitivity of the sensor system.

The invention is based on the object of providing a sensor system of the type discussed hereinabove wherein the lifetime of the incandescent lamp is prolonged and a saving in energy is obtained at the same time.

This object has been attained according to the invention by regulating the energy source of the incandescent lamp and coupling the energy source with the evaluating stage in such a way that the desired value of the regulated energy source is automatically adjustable in dependence on the sensitivity setting of the evaluating stage.

Thus, in the sensor system according to this invention, the desired value of the energy source, which latter can be designed as a controlled current or voltage source, is not maintained constant but rather is varied depending on the set sensitivity, the arrangement preferably being such that a desired value corresponding to the nominal value of the current of the incandescent lamp is applied to the controlled energy source only in a maximum sensitivity level of the evaluating stage. Consequently, the incandescent lamp is operated with its rated current only in the highest sensitivity stage. In all other cases, a lower current is applied to the incandescent lamp. As was found in voluminous tests, this ensues in a considerable lengthening of the average life expectancy of the incandescent lamp. At the same time, the energy consumption of the sensor system is thereby reduced.

In a further embodiment of the invention, the evaluating stage is associated with a first control member for a stepwise coarse adjustment of sensitivity, and with a second control member for fine adjustment of sensitivity, the desired value setting of the regulated energy source being coupled with the first control member.

The regulated energy source can furthermore be preferably provided with an actuation delay stage, preventing upon switching on of the incandescent lamp an overshooting of the current past the set desired value. For it has been found that, when using a constant voltage source, the switching on current can rise up to six times the rated current. Such overcurrents, deleterious to the lifetime of the incandescent lamp, can be safely prevented by the aforementioned actuation delay stage. The actuation delay stage can be designed, in this arrangement, so that it allows the incandescent lamp current, upon activation, to rise gradually from zero to the rated value, for example within a time span of 1-2 seconds. Even if the arrangement is designed so that the incandescent lamp current passes over jump-like from zero to the desired value that has been set, a delayed lighting of the incandescent lamp is achieved by the fact that the internal resistance of the incandescent lamp changes in dependence on the heating up of the lamp filament. The essential aspect resides in that it is ensured that the set desired nominal current is not exceeded during the switching on step.

In a further development of the invention, the controlled energy source can include a timed switching regulator. As compared with a constant voltage source with a series transistor as the control member, an extensively loss-free control is thereby attained. Suitably, a choke can be connected between the switching regulator and the incandescent lamp The choke acts as an energy storage means which, in collaboration with the switching regulator, causes the lamp current to follow the desired value essentially without any losses.

The evaluating stage can exhibit an amplifier with subsequently connected comparator For the purpose of sensitivity adjustment, the amplification factor of the amplifier can be adjustable in this arrangement. However, it is likewise possible, for example, to make the switching threshold of the comparator adjustable for setting the sensitivity.

The invention will be described in greater detail below with reference to several embodiments embodiment. In the appended drawings.

Figure 1:
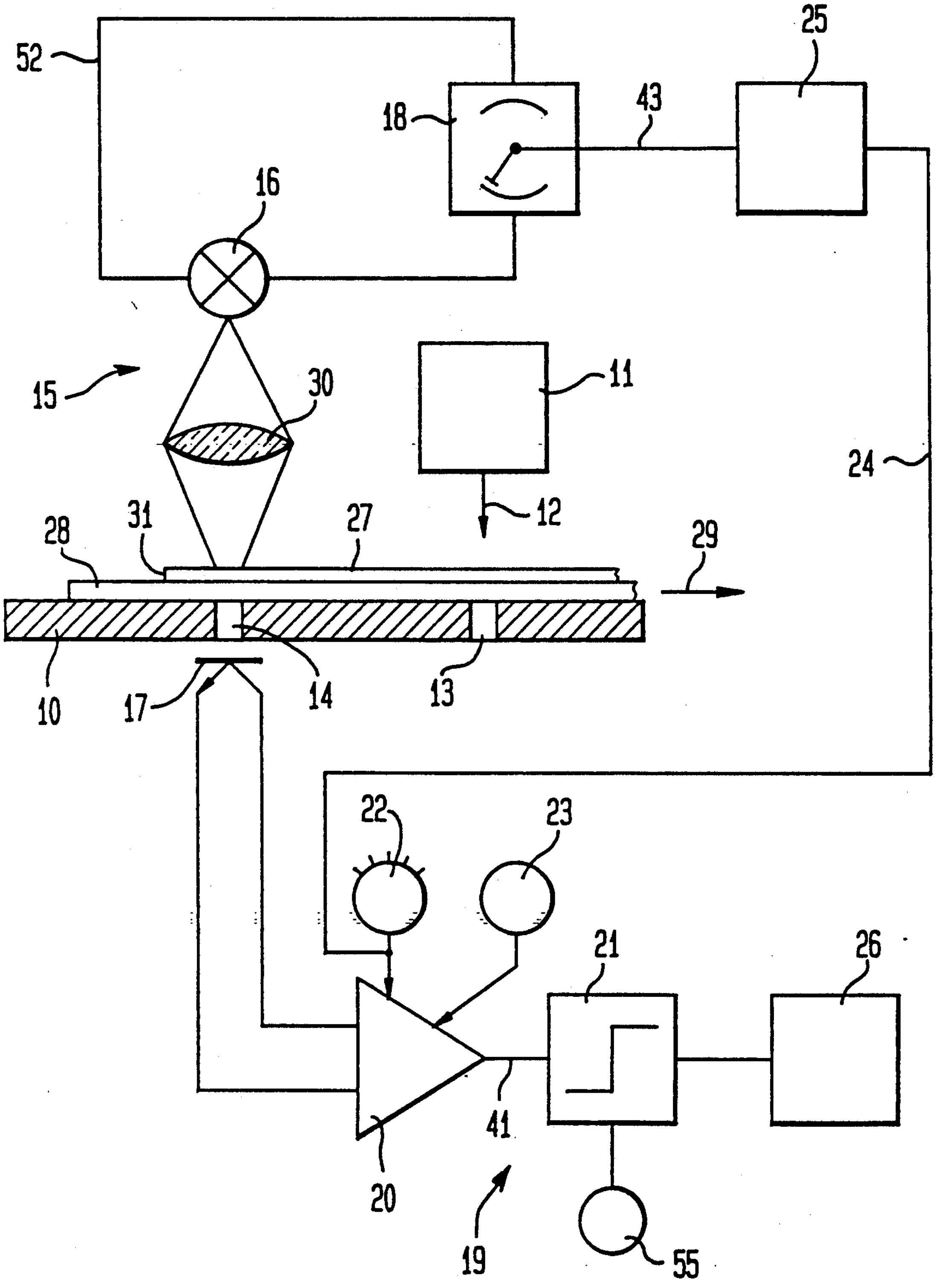
FIG. 1 shows a basic diagram of the sensor system.

In the basic illustration in accordance with FIG. 1, 10 denotes the needle plate of a sewing machine 11, the needle of the latter being indicated at 12. The needle plate 10 exhibits, in addition to a bore 13 for passage of the needle 12, a further bore 14 arranged in the sewing direction at a spacing from the bore 13. The bore 14 lies in the beam path of a light barrier 15, designed in this example as a transmitted light barrier and including a light transmitter in the form of an incandescent lamp 16 and a light receiver 17 which can be, for example, a phototransistor. The incandescent lamp 16 is supplied from a regulated energy source 18 designed as a controlled current or voltage source with an adjustable desired value An evaluating stage 19 with adjustable sensitivity is connected after the light receiver 17. The evaluating stage 19 comprises an amplifier 20 with a comparator 21 connected thereafter. For adjusting the sensitivity of the evaluating stage 19, a first control member 22 for stepwise coarse adjustment of the sensitivity and a second control member 23 for stepwise or infinitely variable fine adjustment of the sensitivity are provided. In the illustrated embodiment, the gain of the amplifier 20 can be adjusted by means of the control members 22 and 23. In correspondence with a modified embodiment, the arrangement can also be such that the switching threshold of the comparator 21 can be adjusted by means of the control members 22 and 23. The first control member 22 furthermore acts, via a conductor 24, on a functional block 25 connected in front of the regulated energy source 18 in order to affect the desired value applied to the regulated energy source 18 in dependence on the setting of the control member 22.

The design is preferably such that a desired value corresponding to the rated value of the current of the incandescent lamp 16 is applied to the controlled energy source 18 only when the first control member 22 has been set to the highest sensitivity stage.

A sewing machine control unit 26 is connected to the output of the evaluating stage 19. The sewing machine control unit 26 can be of conventional construction (compare, in particular, EP Patent 0 102 524).

For explaining the mode of operation of the sensor system, it is assumed that a label 27 is to be sewed onto a sewing material 28, the latter being transported in the direction of arrow 29. As long as the sewing material 28 and the label 27 are located above the bore 14 of the needle plate 10, only a relatively small proportion of the light emitted by the incandescent lamp 16 and focused by means of an optical system 30 passes through the bore 14 to the light receiver 17. As soon as the end edge 31 of the label 27 has, however, passed in the direction of arrow 29 through the beam path of the light barrier 15, the light of the incandescent lamp 16 need merely penetrate the sewing material 28. The light attenuation decreases accordingly. A correspondingly larger portion of light passes to the light receiver 17. By way of the control members 22 and 23, the amplification factor of amplifier 20 is adjusted so that the output signal of amplifier 20 lies below a fixed switching threshold of the comparator 21 if the light must pass through the label 27 and the sewing material 28, but so that the output signal of the amplifier 20 exceeds this switching threshold as soon as merely the sewing material 28 lies in the beam path of the light barrier 15. As a consequence, upon passage of the final edge 31 through the beam path of the light barrier 15, the sewing machine regulation unit 26 is exposed to a corresponding identifying signal.

By adjusting the desired value of the controlled energy source 18 in dependence on the position of the control member 22, care is taken that the incandescent lamp 16 is supplied with the maximally permissible energy only in case the type of sewing material 28 and the type of label 27 require adjustment of the control member 22 to maximum sensitivity. In the entire remainder of cases, the energy supply to the incandescent lamp 16 is throttled, which is beneficial to the lifetime of the incandescent lamp 16. The controlled energy source 18 is moreover designed preferably so that upon activation of the light barrier 15, overshooting of the incandescent lamp current past the set desired value is prevented, and the incandescent lamp current is increased, for example, gradually from zero to the desired value. A setting indicator 55, suitably in the form of a light-emitting diode, is connected to comparator 21; this setting indicator reveals when the sensitivity has been optimally adjusted by means of the control members 22, 23.

Figure 2:
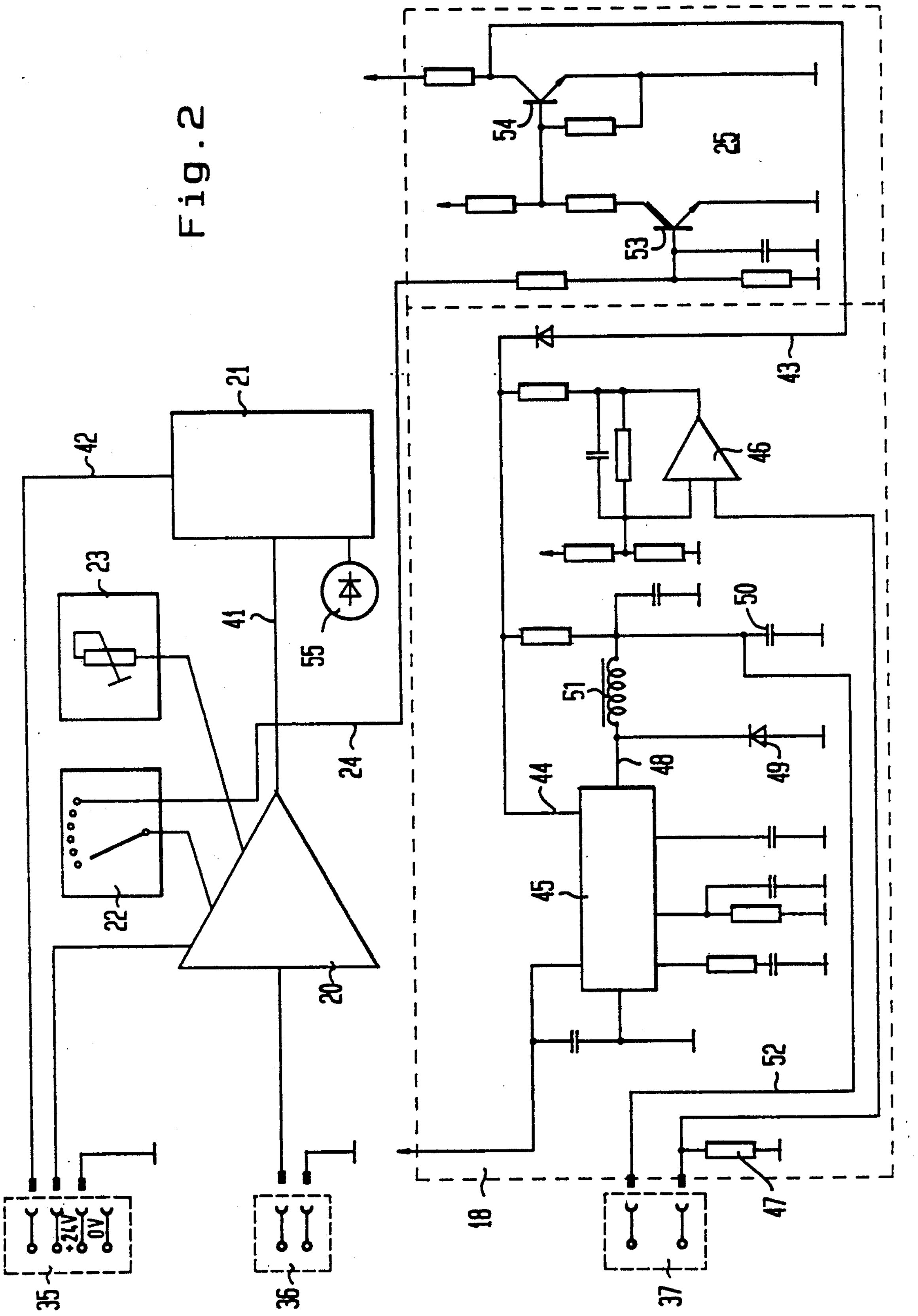
FIG. 2 shows a circuit diagram of the sensor system of FIG. 1 in detail.

In the detailed circuit diagram according to FIG. 2, 35 denotes a plug connection for applying the supply voltage and for connecting the sewing machine regulation unit 26; 36 denotes a plug connection for connecting the light receiver 17; and 37 denotes a plug connection for connecting the incandescent lamp 16. The control member 22 for the coarse adjustment of the sensitivity of the evaluating stage 19 is illustrated as a six-step switch, the control member 23 for fine sensitivity adjustment is shown as a potentiometer. The control members are connected to the amplifier 20 which latter exhibits an adjustable amplification factor. The output of amplifier 20 is connected via a conductor 41 to the input of comparator 21 which latter exhibits a fixed switching threshold. The output of comparator 21 is connected via a line 42 to a contact of the plug connection 35 to which the sewing machine control unit 26 is connected. The sixth step of the control member 22, corresponding to maximum sensitivity, is connected via line 24 to the functional block 25, the output of the latter being connected via a line 43 to an input 44 of a switching regulator 45 which is part of the regulated energy source 18. The input 44 of the switching regulator 45 is furthermore connected via an amplifier stage 46 to an ammeter resistor 47 which latter detects the actual current of the incandescent lamp 16. A diode 49 is connected between the output of the switching regulator 48 and ground, a capacitor 50 being connected in parallel with this diode via a choke 51. The junction point of capacitor 50 and choke 51 is connected via a line 52 to the incandescent lamp 16.

In the embodiment according to FIG. 2, a transistor 53 of the functional block 25 is blocked when setting the control member 22 to maximum sensitivity stage via the line 24 whereby also a transistor 54 is blocked which is connected after transistor 53. Once the transistor 54 becomes nonconductive, the potential at the collector of transistor 54 rises. This rise in potential acts via the line 43 on the switching regulator 45 along the lines of increasing the desired value of the controlled energy source 18 In all remaining positions of the control member 22, the energy source 18 operates at reduced desired value. The switching regulator 45 in cooperation with the choke 51 takes care of an extensively loss-free regulation. The capacitor 50 and the choke 51 constitute an actuation delay stage which, upon activation of the light barrier 15, permits the incandescent lamp current to rise gradually from zero to the desired value, for example within a time period of 1–2 seconds.

Figure 3:
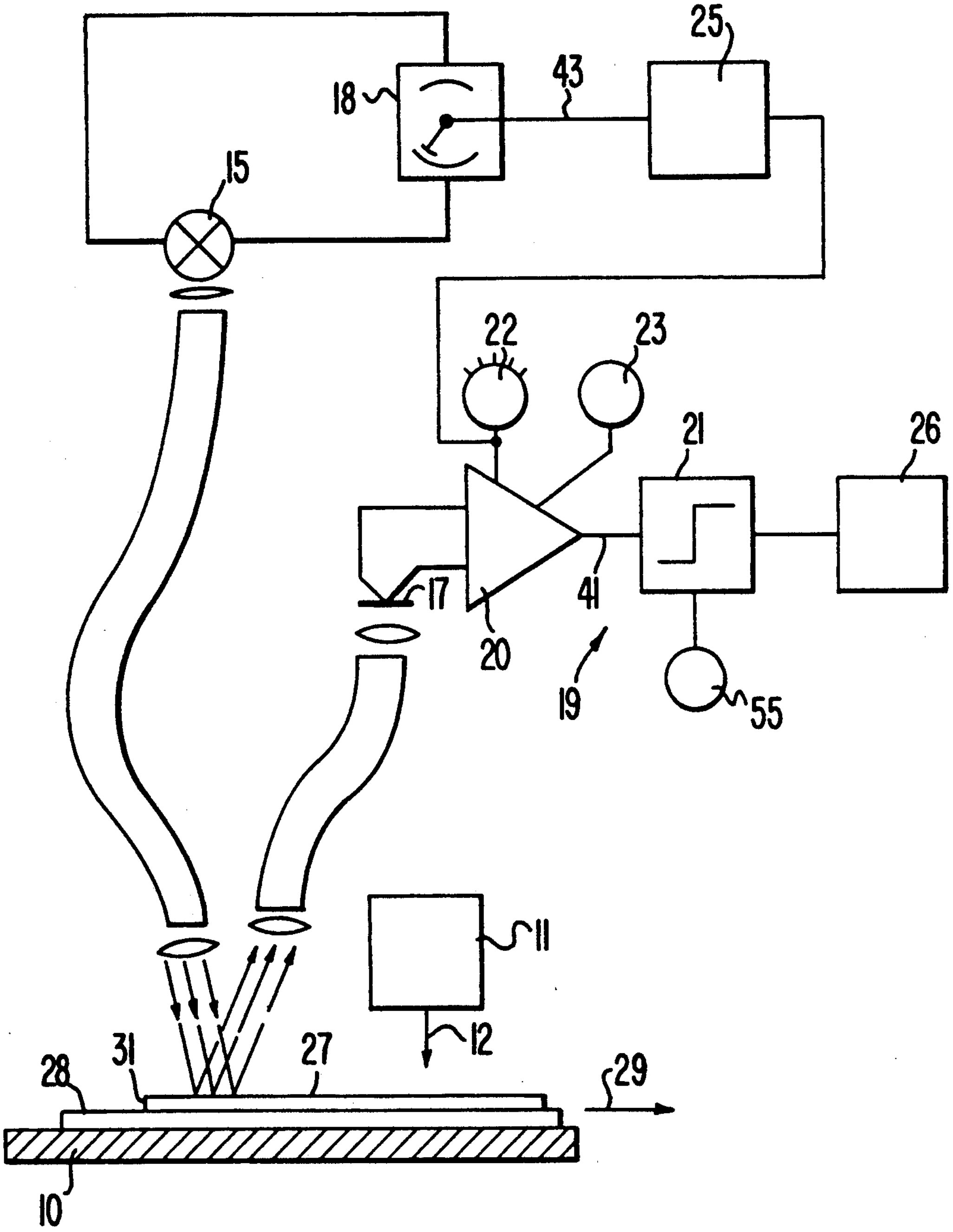
FIG. 3 shows a diagram of the sensor system utilizing a twin light-guide in accordance with another embodiment.

Numerous modifications are feasible within the scope of this invention. For example, each switching position of the control member 22 serving for the coarse adjustment of the sensitivity can be associated with a separate desired value of the controlled energy source 18. Instead of an amplifier 20 with adjustable gain, it is possible to provide a comparator 21 with adjustable switching threshold. The amplifier and the comparator can optionally be combined into one stage. The regulated energy source 18 can take care of regulating the current and/or the voltage for the incandescent lamp 16. In place of a transmitted light barrier, it is also possible to arrange a reflected light barrier wherein the light receiver 18 is located above the needle plate 10 in order to detect light reflected of the sewing material. In this case, the second bore 14 in the needle plate 10 can be omitted. A reflected light barrier can optionally also be of such a structure as shown in FIG. 3, that the light from the incandescent lamp 16 is conducted via a first lightguide to a location lying above the sewing material 28, and reflected light is received by a second lightguide and transmitted to the light receiver 17. In case of the transmitted light barrier illustrated in FIG. 1, the light receiver 17 can also be inserted in the bore 14.

We claim:

1. Sensor system for regulating machines in dependence on a light barrier comprising a light emitter and a light receiver, an incandescent lamp supplied by an energy source being provided as the light emitter, and an evaluating stage of adjustable sensitivity being connected to the light receiver, characterized in that the energy source of the incandescent lamp is regulated and is coupled with the evaluating stage in such a way that the desired value of the regulated energy source is automatically adjustable in dependence on the sensitivity setting of the evaluating stage.

2. Sensor system according to claim 1, characterized in that a desired value corresponding to the nominal value of the current of the incandescent lamp is applied to the controlled energy source only in a highest sensitivity stage of the evaluating stage.

3. Sensor system according to claim 1 or 2, characterized in that the evaluating stage is associated with a first control member for a stepwise coarse adjustment of sensitivity and a second control member for fine adjustment of sensitivity, and that the desired value setting of the controlled energy source is coupled with the first control member.

4. Sensor system for regulating machines in dependence on a light barrier comprising a light emitter and alight receiver, an incandescent lamp supplied by an energy source being provided as the light emitter, and an evaluating stage of adjustable sensitivity being connected to the light receiver, characterized in that the energy source of the incandescent lamp is regulated and is coupled with the evaluating stage in such a way that the desired value of the regulated energy source is automatically adjustable in dependence on the sensitivity setting of the evaluating stage, and that the controlled energy is provided with a actuation delay stage preventing, upon activation, an overshooting of the incandescent lamp current past the set desired value.

5. Sensor system according to claim 4, characterized in that the actuation delay stage is designed so that it allows, upon activation, the incandescent lamp current to rise gradually from zero to the desired value.

6. Sensor system for regulating machines in dependence on a light barrier comprising a light emitter and a light receiver, an incandescent lamp supplied by an energy source being provided as the light emitter, and an evaluating stage of adjustable sensitivity being connected to the light receiver, characterized in that the energy source of the incandescent lamp is regulated and is coupled with the evaluating stage in such a way that the desired value of the regulated energy source is automatically adjustable in dependence on the sensitivity setting of the evaluating stage, and that the controlled energy source comprises a timed switching regulator.

7. Sensor system according to claim 6, characterized in that a choke is connected between the switching regulator and the incandescent lamp.

8. Sensor system for regulating machines in dependence on a light barrier comprising a light emitter and a light receiver, an incandescent lamp supplied by an energy source being provided as the light emitter, and an evaluating stage of adjustable sensitivity being connected to the light receiver, characterized in that the energy source of the incandescent lamp is regulated and is coupled with the evaluating stage in such a way that the desired value of the regulated energy source is automatically adjustable in dependence on the sensitivity setting of the evaluating stage, and that the evaluating stage exhibits an amplifier with a comparator connected thereafter.

9. Sensor system according to claim 8, characterized in that the gain of the amplifier is adjustable for the purpose of setting the sensitivity.

10. Sensor system according to claim 8, characterized in that the switching threshold of the comparator is adjustable for the purpose of setting the sensitivity.

11. Sensor system according to one of claims 8–10, characterized in that the comparator is associated with a setting indicator for indicating the optimum sensitivity setting.

12. Sensor system according to claim 11, characterized in that a light-emitting diode is provided as the setting indicator.

13. Sensor system for regulating machines in dependence on a light barrier comprising a light emitter and a light receiver, an incandescent lamp supplied by an energy source being provided as the light emitter, and an evaluating stage of adjustable sensitivity being connected to the light receiver, characterized in that the energy source of the incandescent lamp is regulated and is coupled with the evaluating stage in such a way that the desired value of the regulated energy source is automatically adjustable in dependence on the sensitivity setting of the evaluating stage, and that the light barrier is designed as a reflected light barrier with twin lightguide, one component of the twin light guide conducting the transmitted light and the other component of the twin light guide conducting the reflected reception light.

14. A sensor system according to claim 1, characterized in that the light receiver is adapted to receive light emitted from the light emitter, and that the desired value of the regulated energy source is automatically adjustable in dependence on the sensitivity setting of the evaluating stage independently of the light received by the light receiver.

15. A sensor system according to claim 1, characterized in that the regulating machine is a sewing machine, that the evaluating stage evaluates the light received by the light receiver, and that the desired value of the regulated energy source is automatically adjustable in dependence on the sensitivity setting of the evaluating stage independently of the light received by the light receiver.

16. A sensor system according to claim 1, characterized in that the evaluating stage provides an output in accordance with the light received by the light receiver, and that the desired value of the regulated energy source is automatically adjustable in dependence on the sensitivity setting of the evaluating stage independently of the output of the evaluating stage.

* * * * *